United States Patent [19]

Vargiu et al.

[11] 4,203,816

[45] May 20, 1980

[54] COMPOSITIONS HARDENABLE BY UV RADIATION COMPRISING AN UNSATURATED EPOXY RESIN ESTER AND AN UNSATURATED MONOMER

[75] Inventors: Silvio Vargiu, Casatenovo; Edoardo Carpaneti, Sovico; Beppino Passalenti, Lissone, all of Italy

[73] Assignee: Societa' Italiana Resine S.I.R. S.p.A., Milan, Italy

[21] Appl. No.: 38,160

[22] Filed: May 11, 1979

Related U.S. Application Data

[63] Continuation of Ser. No. 894,319, Apr. 7, 1978, abandoned.

[30] Foreign Application Priority Data

Apr. 7, 1977 [IT] Italy ................... 22183 A/77

[51] Int. Cl.$^2$ ...................... C08G 18/00; C08G 63/00
[52] U.S. Cl. ...................... 204/159.16; 204/159.19; 204/159.23; 204/159.24; 260/18 EP; 260/23 EP; 427/54.1; 428/417; 525/531; 525/922
[58] Field of Search ...................... 260/23 EP, 18 EP; 204/159.19, 159.16, 159.23, 159.24; 525/531, 922

[56] References Cited

U.S. PATENT DOCUMENTS

| | | | |
|---|---|---|---|
| 3,663,484 | 5/1972 | Broecker | 260/19 EP |
| 3,674,545 | 7/1972 | Strolle | 117/93.31 |
| 3,713,864 | 1/1973 | Ackerman et al. | 117/38 |
| 3,876,432 | 4/1975 | Carlick et al. | 96/115 P |
| 3,912,670 | 10/1975 | Huemmer et al. | 260/23 EP |
| 4,003,868 | 1/1977 | Smith et al. | 260/21 |
| 4,025,407 | 5/1977 | Chang et al. | 204/159.14 |
| 4,025,477 | 5/1977 | Borden et al. | 260/23 EP |
| 4,045,394 | 8/1977 | Hess | 260/23 AR |
| 4,075,148 | 2/1978 | Zatmann | 260/23 EP |

*Primary Examiner*—Richard B. Turer
*Attorney, Agent, or Firm*—Sughrue, Rothwell, Mion, Zinn and Macpeak

[57] ABSTRACT

A composition hardenable by means of ultra-violet radiations, which comprises (a) an unsaturated epoxy resin ester obtained by reacting an epoxy or epoxy novolak resin with an unsaturated monocarboxylic fatty acid with 18 carbon atoms per molecule and with acrylic and/or methacrylic acid, the fatty acid being used in an amount of 20-80 moles for each 100 moles of the sum of the acids, (b) a mono- or poly-functional unsaturated monomer and (c) a photo-sensitive substance. The composition comprises 3-97 parts by weight of component (a) and 1.2-3.5 parts by weight of component (c) for each 100 parts by weight of the sum of components (a) and (b).

7 Claims, No Drawings

COMPOSITIONS HARDENABLE BY UV RADIATION COMPRISING AN UNSATURATED EPOXY RESIN ESTER AND AN UNSATURATED MONOMER

This application is a continuation of Ser. No. 894,319 filed Apr. 7, 1978 and now abandoned.

The present invention relates to a composition hardenable by means of UV (ultra-violet) radiations, which comprises an unsaturated epoxy resin ester and an ethylenically unsaturated monomer copolymerizable with the latter.

It is known in the art how to react an epoxy resin with an unsaturated monocarboxylic acid, such as acrylic or methacrylic acid. The reaction between the oxirane bridge of the epoxy resin and the carboxyl group of the unsaturated monocarboxylic acid, leads to the formation of unsaturated epoxy resin esters soluble in styrene and the resulting solutions can be hardened by peroxide catalysts in the same way as conventional unsaturated polyester resins. Hardening occurs by cross-linking between the double bond of styrene and that of the unsaturated acid interacted with the epoxy resin.

It is also known in the art how to react an epoxy novolak resin with acrylic or methacrylic acid to produce unsaturated epoxy resin esters, whose solutions in styrene can be hardened by means of peroxides. In this case, one generally obtains a higher degree of cross-linking by hardening, because the epoxy function is higher than that of the epoxy resin ester obtained from the epoxy resin.

Hardening of the compositions under discussion by means of UV radiations has also been described in the art, since this method affords a quicker hardening cycle and a lower energy consuption, in addition to a reduction of the pollution phenomena.

In practice, the compositions described have a poor wetting power for pigments and fillers in general. Moreover, the articles obtained by cross-linking by means of peroxides or by means of UV radiations have some undesired properties, especially somewhat poor bending strength values. Finally, when using UV radiations, the velocity and degree of completion of the hardening reaction may be unsatisfactory.

The drawbacks described above are overcome, or at least greatly reduced by means of the compositions of the present invention, which harden quickly and completely under the action of UV radiations to give articles endowed with high properties, especially those relating to the bending strength and toughness. Moreover, said compositions easily wet pigments and fillers in general, so that their practical uses are facilitated.

Thus, the invention provides a composition hardenable by means of ultra-violet radiations, which comprises:

(a) an unsaturated epoxy resin ester which is the reaction product of an epoxy resin wherein R is the divalent radical of a diphenol HO—R—OH and n has a value of from 0 to 14, or an epoxy novolak resin

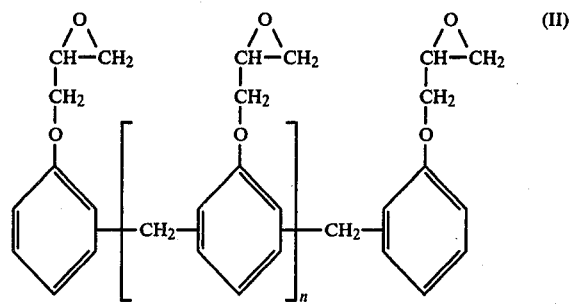

wherein n has a value of from 0 to 4, with one or more unsaturated monocarboxylic fatty acids with 18 carbon atoms per molecule, and with one or more lower unsaturated acids chosen from acrylic and methacrylic acids, said fatty and lower acids being used in an overall amount equivalent, or about equivalent to the number of oxirane bridges of the epoxy or epoxy novolak resin and said fatty acids being used in an amount of from 20 to 80 moles for each 100 moles of the sum of the fatty and lower acids;

(b) one or more mono- or polyfunctional unsaturated monomers co-polymerizable with said unsaturated epoxy resin ester; and (c) a photosensitive substance which decomposes under the action of ultra-violet radiations; the component (a) being present in the composition in an amount of from 3 to 97 parts by weight for each 100 parts by weight of the sum of components (a) and (b) and the component (c) in an amount of from 1.2 to 3.5parts by weight for each 100 parts by weight of the sum of components (a) and (b).

The epoxy resin (I) may be prepared by conventional methods, by contacting epichlorohydrin and a diphenol, especially 2,2-bis(4-hydroxyphenyl) propane (bisphenol-A), in a molar ratio generally higher than about 8:1, operating in the presence of an inorganic base added in an amount equal to, or about equal to 2 moles for each mole of diphenol.

Thus, for example, a concentrated aqueous solution of the inorganic base (sodium hydroxide) may be added to a solution of bisphenol-A in epichlorohydrin, using a feed rate and a temperature such that the water introduced with the base be distilled off in the form of an azeotrope with epichlorohydrin.

The reaction between bisphenol-A and epichlorohydrin may also be carried out at a temperature such as to substantially avoid boiling of the reagents, even if generally the temperature is not kept below 80° C.

In each case, upon completion of the reaction, the unreacted epichlorohydrin is removed, generally by distillation, and the alkali metal chloride obtained as a by-product of the reaction is removed from the distillation residue.

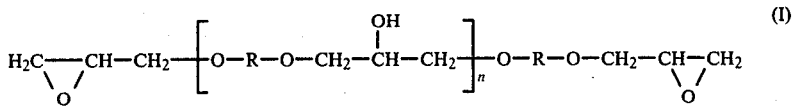

To this end the epoxy resin may be dissolved in a solvent, such as toluene, and the latter is finally removed.

The properties of the epoxy resin thus obtained are typically within the following ranges of values:
epoxy equivalent: 180–270
viscosity (cps): 3000–50,000.

The said epoxy resin, with a low epoxy equivalent value, is suitable for the reaction with the unsaturated acids.

According to another embodiment the epoxy equivalent value of the resin prepared as described above is increased by reaction with a further amount of bisphenol-A, prior to the reaction with the unsaturated acids.

To this end it is possible to use those conventional methods, which permit the production of epoxy resins with epoxy equivalent values higher than 270 up to about 4,500, having a semi-solid or solid appearance. These epoxy resins with a high epoxy equivalent value are also suitable for the reaction with the unsaturated acids.

The epoxy novolak resins (II) are generally prepared by forming a solution of the novolak phenolic resin in epichlorohydrin, maintaining the ratio between the moles of epichlorohydrin and the number of phenolic hydroxyls of said novolak at a value higher than about 2.5:1.

The aqueous alkali metal hydroxide is then added to the solution thus prepared, until the number of moles of said alkali metal hydroxide is equivalent, or about equivalent, to the number of phenolic hydroxyls of said novolak resin.

The reaction is preferably carried out at a temperature of from 60° to 80° C. and at a pressure lower than atmospheric during the addition of the alkali metal hydroxide, the water being distilled off from the reaction medium in the form of an azeotropic mixture with epichlorohydrin and the unreacted epichlorohydrin being recycled, and a water content of from 0.5 to 2.5% by weight and a pH value of from 7 to 8 being continuously maintained in the reaction medium.

Upon completion of the addition of the alkali metal hydroxide, the water is completely removed from the reaction medium by distillation and the epoxy novolak resin is recovered.

By operating according to the procedure described, a practically complete epoxidation of the phenolic hydroxyl groups of the novolak phenolic resin is obtained, while avoiding, or at least substantially reducing the side reactions and obtaining an epoxy novolak resin particularly suitable for the reaction with the unsaturated acids.

The unsaturated epoxy resin ester may be prepared by contacting and reacting, in a first step, the epoxy resin (I) or the epoxy novolak resin (II) with an unsaturated monocarboxylic fatty acid with 18 carbon atoms per molecule.

The fatty acids deriving from dehydrated castor oil, linseed oil, soybean oil and tall oil are particularly suitable for the purpose.

The said first step is preferably carried out by maintaining a ratio of from 0.2:1 to 0.8:1 between the number of carboxyl groups of the unsaturated fatty acid and the number of oxirane groups of the epoxy or epoxy novolak resin and maintaining the temperature at a value of from 200° to 240° C., until the acid value of the reaction mixture is reduced to very low values and in general to values equal to, or lower than 2.

The reaction duration is generally of the order of 6–12 hours. The reaction is generally carried out in the presence of a catalyst such as sodium acetate, ammonium, sodium, potassium or lithium carbonate, or a carbonate or acetate of an alkaline earth metal such as calcium and magnesium.

In a preferred embodiment the ratio between the number of carboxyl groups of the unsaturated fatty acid and the number of oxirane groups of the epoxy or epoxy novolak resin is maintained at a value of the order of 0.5:1 and the reaction is carried out at a temperature of about 220°–230° C., using from 1 to 6 moles of catalyst for each 100 moles of unsaturated acid.

The reaction product thus obtained is contacted and reacted with one or more unsaturated acids with a low carbon atom number, chosen from acrylic and methacrylic acids, the quantity of said acids being equivalent, or about equivalent to the number of residual oxirane groups. This second step is carried out under conditions similar to those of the first one, excepting the temperature which is maintained at a value from 100° to 140° C. and preferably at a value of the order of 115°–120° C. The reaction is completed when the acid value of the reaction mixture is equal to, or lower than about 20.

The unsaturated epoxy resin esters thus obtained have properties which depend on the selected epoxy or epoxy novolak resin, on the unsaturated acids with a high and a low carbon atom number which have reacted with the resin, and on the ratio between said acids.

The properties are generally within the following ranges of values:

| | |
|---|---|
| Viscosity in a 70 wt. % solution in n-butyl Carbitol at 25° C.(cps) | : 150–8000 |
| Acid value | : 2–20 |
| Hardening time (minutes) | : 3–20 |
| Peak exotherm temperature (°C.) | : 60–100 |

The epoxy resin esters thus obtained are admixed with one or more mono- or poly-functional liquid unsaturated monomers copolymerizable with the epoxy resin esters. Examples of monofunctional unsaturated monomers are styrene, vinyltoluene, alpha methyl styrene, methyl methacrylate and vinyl cyclohexene. Examples of polyfunctional unsaturated monomers are pentaerythritol tetraacrylate, trimetylol-propane triacrylate, butanediol diacrylate and glyceryl triacrylate.

The unsaturated monomers are preferably used in amounts of the order of 5–50 parts by weight for each 100 parts by weight of the corresponding solution of epoxy resin ester in the monomers.

The composition comprises a photosensitive substance, which may be chosen from among those known in the art, in order to obtain cross-linking by means of UV radiations. Examples of said substances are benzoin, derivatives of benzoin containing in the alpha position an alkyl or alkyl ether group with from 1 to 8 carbon atoms, carbonylated compounds containing a carbon atom bonded to a halogen in the alpha position with respect to the carbonyl group, organic sulphur derivatives, nitrous compounds and organic sulfonyl halides. Preferably, the photosensitive substance is present in an amount of the order to 2.5 parts by weight for each 100 parts by weight of the sum of the epoxy resin ester and unsaturated monomer.

The composition of the present invention may contain conventional additives such as pigments, for example titanium dioxide.

In the following experimental examples the parts and percentages are by weight unless otherwise indicated.

EXAMPLE 1

In a glass flask provided with a stirrer, a thermometer, a pipe for introducing nitrogen near the surface of the reaction medium, and a bubble cooler there are loaded: 1500 parts of epoxy resin (I) (epoxy equivalent 185, Gardner viscosity Z5-Z6, chlorine content 0.02%), 1130 parts of unsaturated fatty acids obtained from dehydrated castor oil and 3.7 parts of a 10% aqueous solution of sodium carbonate.

The mixture is heated to a temperature of 220°–230° C. in 30 minutes and maintained under such conditions until the reaction product has the following characteristics: epoxy equivalent 650-700; Gardner viscosity (at 25° C. in a 80% solution in butyl carbitol) O-P; acid value $\leq 2$.

2600 parts of the reaction product thus obtained are brought to a temperature of 115°–120° C. and a mixture of 276 parts of acrylic acid and 8.3 parts of sodium carbonate is added over a period of about 2 hours.

The whole is maintained at the temperature shown until an unsaturated epoxy ester is produced with the following characteristics:

| | |
|---|---|
| Holde-Hubbelhode viscosity in a 70% solution in butyl carbitol | : 180–220 cps |
| Gardner colour number in a 70% solution in butyl carbitol | : 3 as a maximum |
| acid value (dry matter) | : 6 as a maximum |
| gel time at 25° C. | : 6 minutes |
| peak exotherm temperature | : 75° C. |
| peak exotherm time | : 20 minutes. |

The gel time is determined by using a composition containing 100 parts of unsaturated epoxy resin ester, one part of benzoyl peroxide, 0.2 parts of cobalt octoate with 6% of metal and 0.3 parts of dimethylaniline.

EXAMPLE 2

Operating as in Example 1, the reactor is charged with 1900 parts of an epoxy resin (I) (epoxy equivalent 473, melting point 50°–55° C.), 550 parts of unsaturated fatty acids obtained from dehydrated castor oil and 3.7 parts of a 10% aqueous solution of sodium carbonate.

The whole is heated to 215° C. in 30 minutes and maintained under such conditions until the reaction product has the following characteristics: epoxy equivalent 1000–1150; Gardner viscosity at 25° C. in a 80% solution in butyl carbitol: Z5-Z6; acid value (dry matter)$\leq 2$.

2400 parts of the reactions product are heated to 120° C. and a mixture of 212 parts of acrylic acid and 6.4 parts of sodium carbonate is added over two hours.

The whole is maintained at 120° C. until an unsaturated epoxy resin ester is obtained having the following characteristics, determined in the same manner as in Example 1:

| | |
|---|---|
| viscosity | : 5000–5500 cps |
| Gardner colour number | : 4 as a maximum |
| acid value (dry matter) | : 20 as a maximum |
| gel time | : 7.5 minutes |
| peak exotherm temperature | : 70° C. |
| peak exotherm time | : 25 minutes. |

EXAMPLE 3

Operating as in Example 1, the reactor is charged with 860 parts of an epoxy novolak resin (II) (epoxy equivalent 169, Gardner viscosity Z7+½, chlorine percent 0.07, Gardner colour number 3), 775 parts of unsaturated fatty acids obtained from dehydrated castor oil and 2.5 parts of a 10% aqueous solution of sodium carbonate. The whole is heated to 215° C. in 30 minutes and maintained under such conditions until the reaction product has the following characteristics: epoxy equivalent 700–750; Gardner viscosity at 25° C. in a 80% solution in butyl carbitol: U, acid value (dry matter)$\leq 2$.

1500 parts of the reaction product thus obtained are brought to 120° C. and a mixture consisting of 174 parts of acrylic acid and 4.2 parts of sodium carbonate is added over 2 hours.

The whole is maintained at the temperature shown until an unsaturated epoxy resin ester is obtained, having the following characteristics, determined in the same manner as in Example 1:

| | |
|---|---|
| viscosity | : 350–400 cps |
| Gardner colour | : 3 as a maximum |
| acid value (dry matter) | : 15 as a maximum |
| gel time | : 12 minutes |
| peak exotherm temperature | : 82° C. |
| peak exotherm time | : 32 minutes. |

The epoxy resin esters obtained in Examples 1 to 3 are used for the preparation of the compositions which are submitted to irradiation by means of UV radiations.

More particularly, these compositions are formed of:

| | |
|---|---|
| unsaturated epoxy resin ester | 84 parts |
| photosensitive substance | 2.4 parts |
| pentaetythritol tetraacrylate | 6.3 parts |
| cobalt octoate (12% of Co) | 0.68 parts. |

The photosensitive substance is benzoin tertiary butyl ether.

Films having a thickness of 25, 50 and 100 microns are applied on glass slides by means of a film-spreader. Each film is maintained at room temperature for 3 minutes prior to the irradiation; the latter is carried out with a time of exposure to radiations of 15,30 and 45 seconds.

More particularly, the films are exposed to radiations in a tunnel having a length of 0.5 meters, containing four 2000 Watts PhilipsHTQ-7 lamps, irradiating on the 2400–59000 Å UV band with a maximum intensity from 3,200 to 3,600 Å. The tunnel is equipped with a belt conveyor having a variable speed, so as to select the desired exposure times.

After exposure to the radiations the surface hardness of the test-pieces is determined by using the Albert-Koënig pendulum according to the DIN 53-171 standards.

The results obtained with the compositions containing the epoxy resin esters of Examples 1 to 3 and with the different film thicknesses, are show in the Table.

| Exposure time (seconds) | Film thickness (microns) | | |
|---|---|---|---|
| | 100 | 50 | 25 |
| | Time (seconds) | | |
| Comp.Ex.1 | | | |
| 15 | 4 | 7 | 12 |
| 30 | 20 | 24 | 36 |
| 45 | 28 | 30 | 50 |
| Comp.Ex.2 | | | |
| 15 | 6 | 8 | 9 |
| 30 | 14 | 17 | 32 |
| 45 | 42 | 44 | 56 |
| Comp.Ex.3 | | | |
| 15 | 10 | 12 | 25 |
| 30 | 25 | 32 | 35 |
| 45 | 32 | 40 | 53 |

We claim:

1. A composition hardenable by means of ultra-violet radiations, which comprises:
   (a) an unsaturated epoxy resin ester which is a reaction product prepared by a process consisting essentially of reacting an epoxy resin

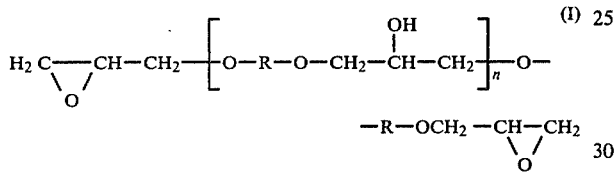

wherein R is the divalent radical of a dephenol HO-R-OH and n has a value of from 0 to 14, or an epoxy novolak resin

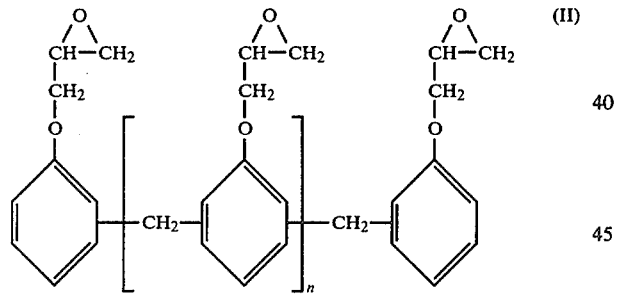

wherein n has a value of from 0 to 4, with one or more unsaturated monocarboxylic fatty acids with 18 carbon atoms per molecule, and then with one or more lower unsaturated acids chosen from acrylic and methacrylic acids, said fatty and lower acids being used in an overall amount equivalent, or about equivalent to the number of oxirane bridges of the epoxy or epoxy novolak resin and said fatty acids being used in an amount of from 20 to 80 moles for each 100 moles of the sum of the fatty and lower acids;
   (b) one or more mono- or polyfunctional unsaturated monomers copolymerizable with said unsaturated epoxy resin ester; and
   (c) a photosensitive substance which decomposes under the action of ultra-violet radiations and promotes cross-linking by ultra-violet radiations; the component (a) being present in the composition in an amount of from 3 to 97 parts by weight for each 100 parts by weight of the sum of components (a) and (b) and the component (c) in an amount of from 1.2 to 3.5 parts by weight for each 100 parts by weight of the sum of the components (a) and (b) and wherein said unsaturated epoxy resin ester (I) contains unreacted internal hydroxy groups where n=1 to 14.

2. The composition of claim 1, wherein said fatty acids are obtained from dehydrated castor oil, linseed oil, soybean oil and tall oil.

3. The composition of claim 1, wherein said monomers are selected from the group consisting of styrene, vinyl toluene, alpha methyl styrene, methyl methacrylate, vinyl cyclohexane, pentaerythritol tetra-acrylate, trimethylolpropane triacrylate, butanediol diacrylate and glyceryl triacrylate.

4. The composition of claim 1,
   wherein said component (b) is present in an amount of from 5 to 50 parts by weight for each 100 parts by weight of the sum of components (a) and (b).

5. The composition of claim 1,
   wherein said diphenol is 2,2-bis(4-hydroxyphenyl) propane.

6. The composition of claim 1,
   wherein said photosensitive substance is selected from the group consisting of benzoin, benzoin derivatives containing in the alpha position an alkyl or alkyl ether radical with from 1 to 8 carbon atoms per molecule, organic sulphur derivatives, nitrous compounds, organic sulfonyl halides and carboxylated compounds containing a carbon atom linked to a halogen in the alpha position with respect to the carboxyl group.

7. The composition of claim 1,
   wherein the component (c) is present in an amount of about 2.5 parts by weight for each 100 parts by weight of the sum of components (a) and (b).

* * * * *